(12) United States Patent
Ferrone et al.

(10) Patent No.: US 7,164,350 B2
(45) Date of Patent: Jan. 16, 2007

(54) BACK UP ALARM SYSTEM

(75) Inventors: Christopher W. Ferrone, Glenview, IL (US); Charles Sinkovits, Norridge, IL (US)

(73) Assignee: Triodyne Inc., Northbrook, IL (US)

( * ) Notice: Subject to any disclaimer, the term of this patent is extended or adjusted under 35 U.S.C. 154(b) by 32 days.

(21) Appl. No.: 10/925,494

(22) Filed: Aug. 24, 2004

(65) Prior Publication Data

US 2005/0275519 A1    Dec. 15, 2005

Related U.S. Application Data

(60) Provisional application No. 60/575,856, filed on Jun. 1, 2004.

(51) Int. Cl.
*B60Q 1/22* (2006.01)

(52) U.S. Cl. .................. 340/463; 340/456; 340/474; 340/471; 340/468; 701/300; 701/301; 701/302; 701/51; 701/64; 701/67; 362/491

(58) Field of Classification Search ............... 340/456, 340/474, 463, 471, 468, 469; 701/300, 301, 701/302, 51, 64, 67; 362/491
See application file for complete search history.

(56) References Cited

U.S. PATENT DOCUMENTS

| | | | | |
|---|---|---|---|---|
| 3,943,507 A | * | 3/1976 | Neal et al. ............... | 340/384.7 |
| 4,859,988 A | * | 8/1989 | Holtvluwer ................ | 340/471 |
| 5,164,701 A | * | 11/1992 | Nan-Mu et al. ........... | 340/464 |
| 6,025,778 A | * | 2/2000 | Dietz et al. ............... | 340/463 |
| 6,885,295 B1 | * | 4/2005 | Hanson-Abbott et al. ... | 340/474 |
| 6,952,162 B1 | * | 10/2005 | Monck et al. .............. | 340/464 |
| 2003/0098785 A1 | * | 5/2003 | Bishop ....................... | 340/431 |

* cited by examiner

*Primary Examiner*—Jeffery Hofsass
*Assistant Examiner*—Edny Labbees
(74) *Attorney, Agent, or Firm*—Pauley Petersen & Erickson

(57) ABSTRACT

A back up alarm system for a vehicle including a sensor for generating a vehicle motion status signal with a vehicle reverse gear engaged. The vehicle motion status signal includes a base electrical signal when the vehicle is stationary and the vehicle motion status signal includes a threshold electrical signal when the vehicle is moving in a reverse direction. A controller is operatively connected to the sensor and receives the vehicle motion status signal from the sensor. The controller activates a first alarm in response to the base electrical signal including at least one of an audible warning signal and a visual warning signal. In response to the threshold electrical signal, the controller activates a second alarm including at least one of an audible warning signal and a visual warning signal.

22 Claims, 5 Drawing Sheets

BACK UP ALARM SYSTEM

CROSS REFERENCE TO RELATED APPLICATION

This application claims the benefit of U.S. Provisional Application No. 60/575,856, filed 1 Jun. 2004.

BACKGROUND OF THE INVENTION

1. Field of the Invention

This invention relates to a vehicle back up alarm system having a first warning signal when a vehicle is shifted into a reverse gear and a second warning signal when the vehicle is moving in a reverse direction.

2. Description of Related Art

Accidents occurring from trucks and equipment backing into or over workers, laborers and pedestrians remain a problem even with the use of back up alarms that beep when trucks are shifted into reverse. Statistics show that 85 fatal accidents occur annually as a result of on-road back ups, and 390 fatal accidents occur annually as a result of off-road back ups. Further, an OSHA accident investigation database indicates that "an audible back up alarm installed by an original equipment manufacturer was ineffective in preventing an accident in two-thirds of the reported back-over accidents."

In the construction industry, OSHA requires that all vehicles be equipped with a back up alarm (BUA) or that a human spotter be employed. Outside the construction field, there are no mandates for a BUA. Conventional BUAs transmit warning signals only when a reverse gear of the vehicle is engaged and continue to transmit the same warning signal while the reverse gear is engaged, whether the vehicle is stationary or moving. Therefore, there is no visual or audible change of the alarm once the vehicle moves, stops and/or moves again.

A conventional BUA system consists of an alarm and a transmission switch that allows current to flow to the alarm when the transmission switch closes, such as when the vehicle reverse gear is engaged. Upon disengagement of the reverse gear, the transmission switch opens, breaking the current flow to the alarm, thus disabling and silencing the alarm.

In order to reduce continuous or unneeded warning signals, which can lead to noise saturation and ultimately complacency, some conventional BUA designs use infrared scanners, sonar or Doppler radar to detect an object behind the vehicle. If an object, such as a person, is detected behind the vehicle, the alarm is activated to transmit a warning signal. However, these conventional BUAs do not communicate to bystanders that the vehicle is in motion. Further, conventional BUAs do not provide any warning signal to bystanders who do not have direct sight of the vehicle as the vehicle moves in the reverse direction.

SUMMARY OF THE INVENTION

Accordingly, it is one object of this invention to provide an improved back up alarm system for a vehicle.

It is another object of this invention to provide a back up alarm system for a vehicle that not only provides a warning signal to bystanders that a vehicle reverse gear has been engaged, but also provides a distinct and separate warning signal when the vehicle is moving in a reverse direction.

These and other objects of this invention are addressed by a back up alarm system for a vehicle including a sensor for generating a vehicle motion status signal with a vehicle reverse gear engaged. The sensor preferably includes an onboard device, an anti-lock braking system speed sensor, a drive shaft road speed sensor, a dedicated inductive AC signal generator and/or a speedometer.

The vehicle motion status signal includes a first or base electrical signal when the vehicle is stationary and a second or threshold electrical signal when the vehicle is moving in a reverse direction. A controller is operatively connected to the sensor and receives the vehicle motion status signal from the sensor. In response to the vehicle motion status signal, the controller activates a first alarm in response to the base electrical signal and/or activates a second alarm in response to the threshold electrical signal. Preferably, each of the first alarm and the second alarm includes an audible warning signal and/or a visual warning signal. For example, in one preferred embodiment of this invention, the second alarm includes a voice enunciator as well as a secondary reverse light, such as at least one strobe light. The controller activates the second alarm and may disable the first alarm when the vehicle is moving in the reverse direction. With the vehicle reverse gear engaged and the vehicle stationary, i.e., the vehicle wheels are not rotating, the first alarm is activated and the second alarm may be disabled.

In one preferred embodiment of this invention, the back up alarm system includes a status alarm that is operatively connected to a transmission of the vehicle and activatable upon engagement of a vehicle reverse gear. The back up alarm system also includes a motion alarm that is operatively connected to a vehicle motion sensor and activatable when the vehicle moves in a reverse direction. The controller, with the reverse gear engaged, activates the status alarm and/or the motion alarm based on a vehicle motion status. The vehicle motion status may be a static state or a dynamic state. In the static state, the controller activates the status alarm and may disable the motion alarm. In the dynamic state, the controller activates the motion alarm and may disable the status alarm.

BRIEF DESCRIPTION OF THE DRAWINGS

These and other objects and features of the invention will be better understood from the following detailed description taken in conjunction with the appended claims and drawings.

DETAILED DESCRIPTION OF PREFERRED EMBODIMENTS

Figure 1:
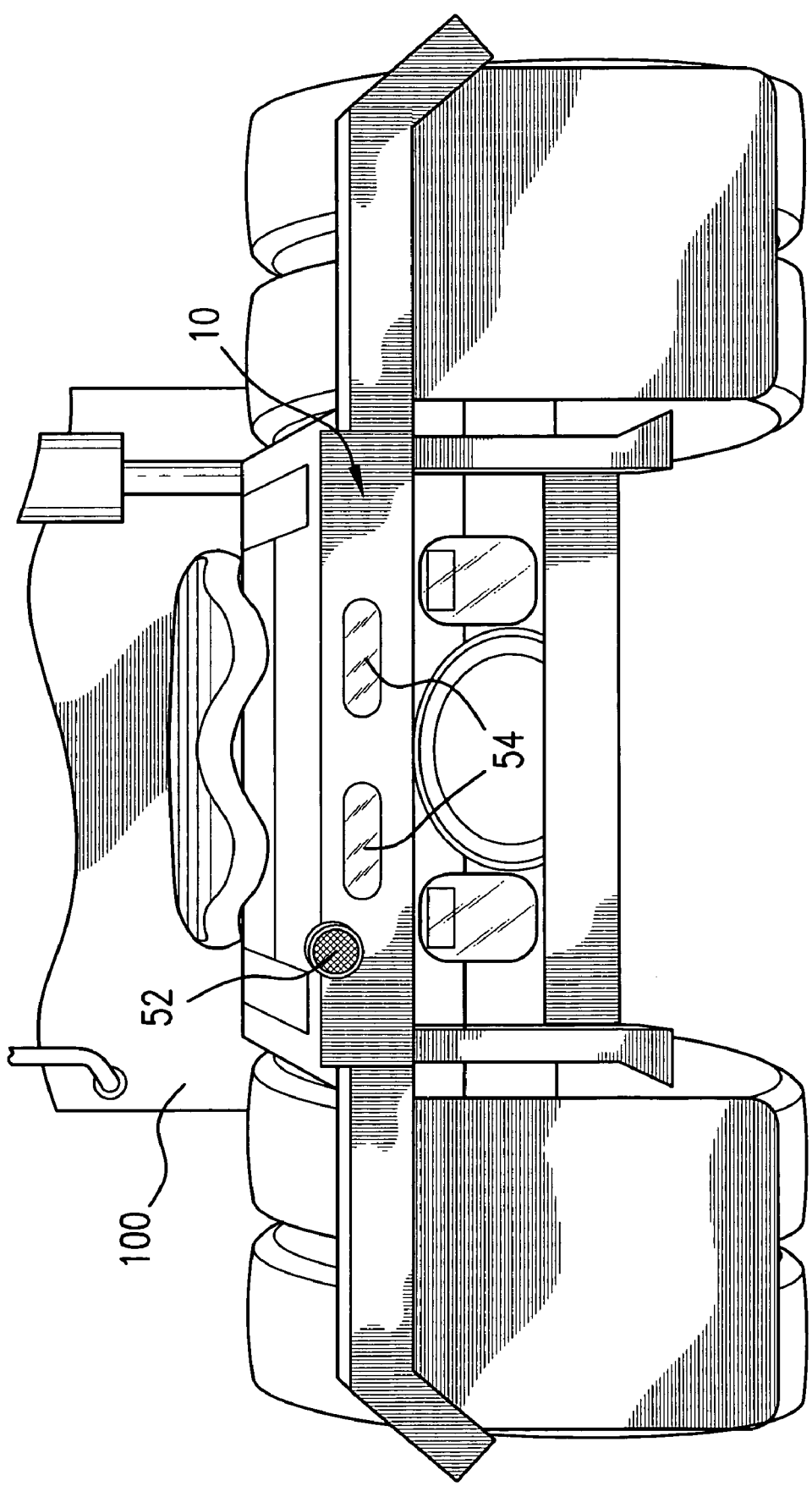
FIG. 1 is a front view of a back up alarm system for a vehicle, according to one preferred embodiment of this invention.
Figure 2:
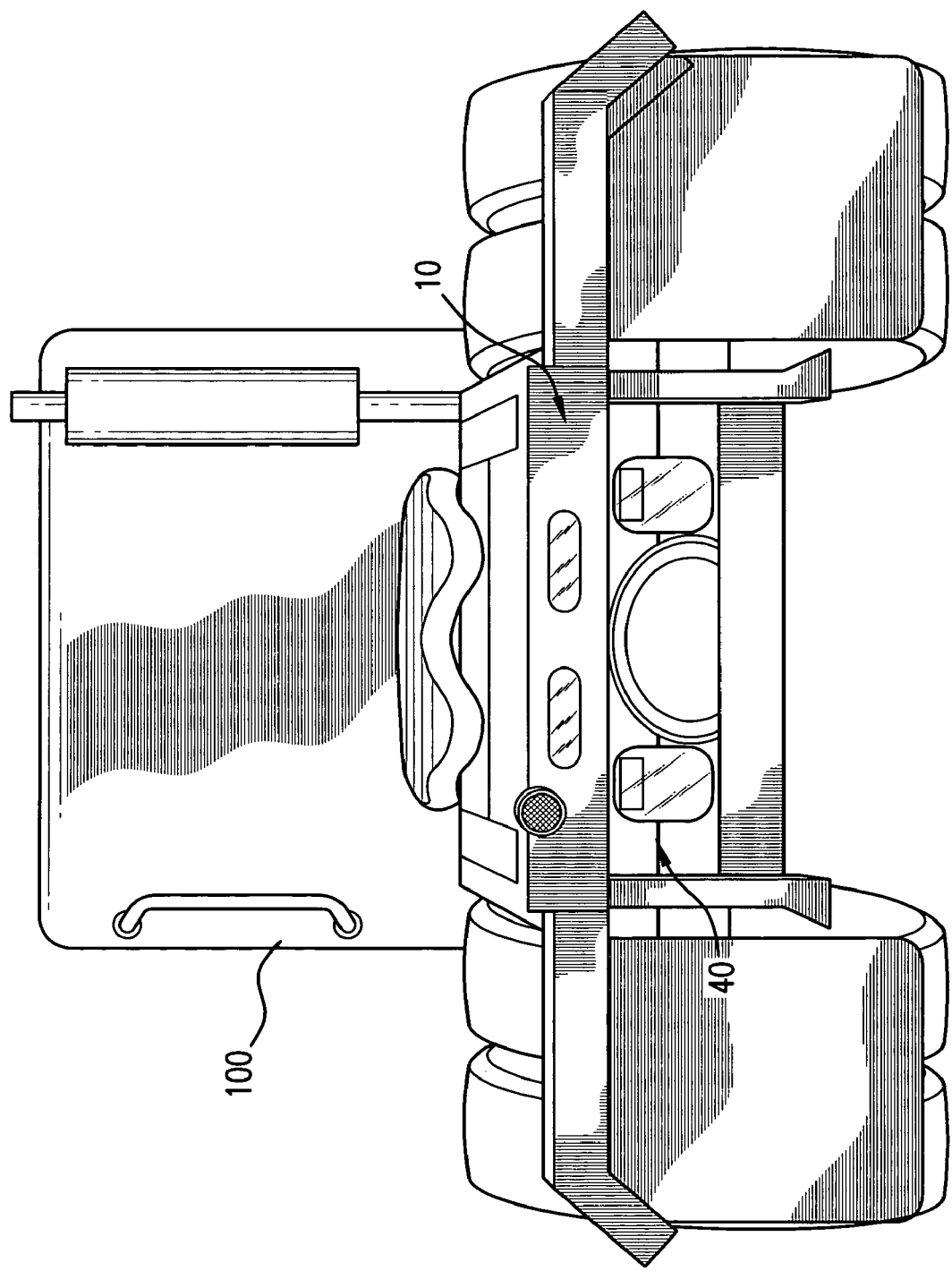
FIG. 2 is a front view of a back up alarm system for a vehicle with a status alarm activated, according to one preferred embodiment of this invention.
Figure 3:
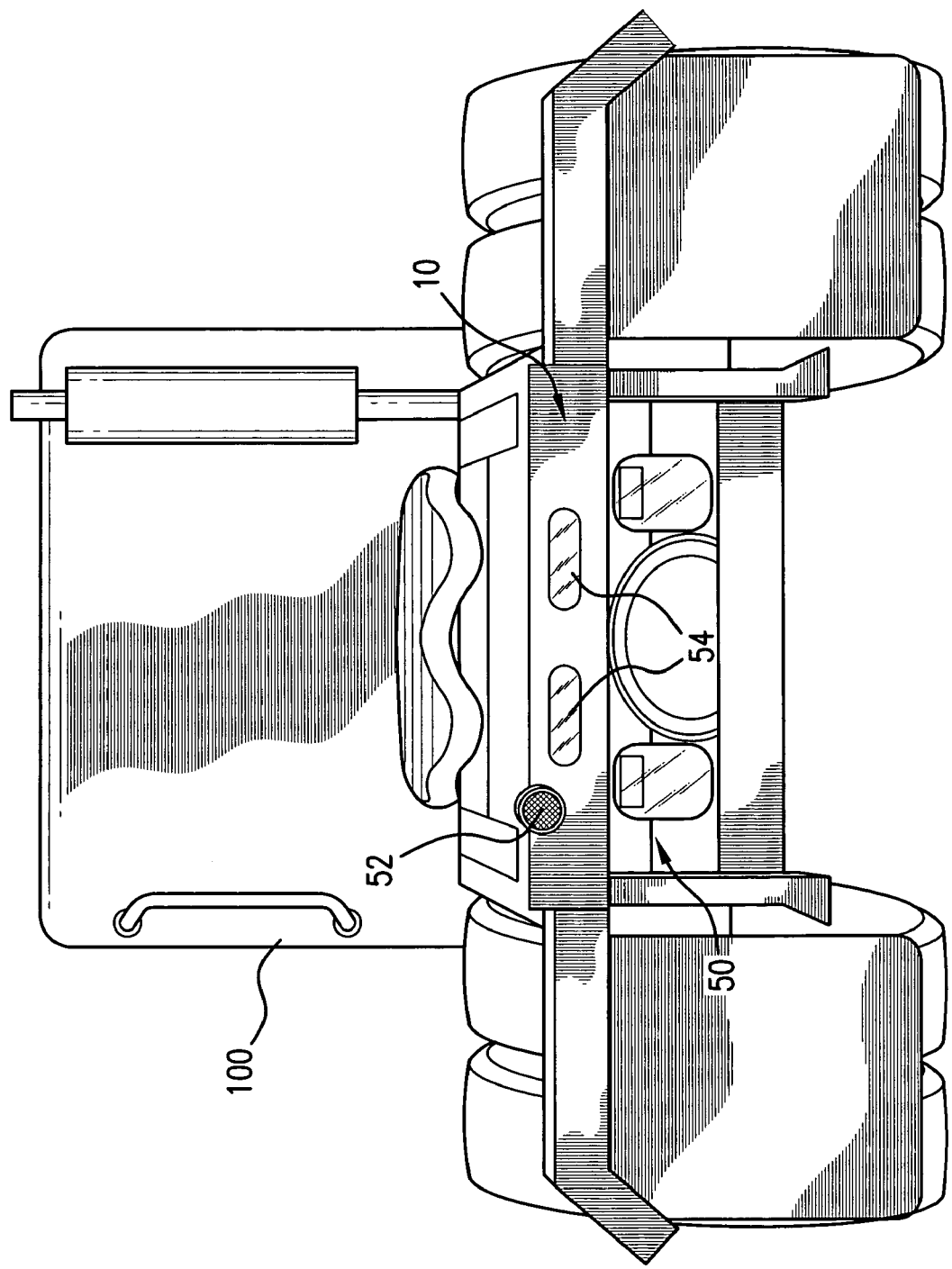
FIG. 3 is a front view of a back up alarm system for a vehicle with a motion alarm activated, according to one preferred embodiment of this invention.

As shown in FIGS. 1–6, the present invention is directed to a back up alarm system 10 for a vehicle 100, such as a truck, having a first alarm 40 that indicates to bystanders that a reverse gear of vehicle 100 is engaged and a distinct second alarm 50 that indicates that vehicle 100 is moving in a generally reverse direction. For example, in one preferred embodiment of this invention, backup alarm system 10 includes a first or status alarm 40 that generates a first warning signal, preferably in addition to the standard reverse taillight signals, when a reverse gear of vehicle 100 is engaged, as shown in FIG. 2. As shown in FIG. 3, with the reverse gear engaged and vehicle 100 moving in the reverse direction, a second or motion alarm 50 generates a second warning signal, preferably in addition to the standard reverse taillight signals, that is different and distinguishable from the first warning signal. Back up alarm system 10 detects vehicle motion and activates or changes a warning signal to alert bystanders that vehicle 100 is in motion.

For example, with the reverse gear engaged, first alarm 40 provides a warning signal in addition to the illumination of the standard vehicle reverse lights. With the reverse gear engaged and upon detection of wheel rotation, second alarm 50 is immediately activated to provide a second warning signal, preferably but not necessarily including a voice or spoken warning signal from a voice enunciator 52. Simultaneously, a secondary reverse light may be activated, such as at least one strobe light 54, in addition to the standard vehicle reverse tail lights. With the vehicle moving in the reverse direction, second alarm 50 will continue to provide at least one warning signal to bystanders. If the vehicle stops, second alarm 50 is disabled and first alarm 40 is activated, with the vehicle reverse gear engaged. If the vehicle begins to move again, first alarm 40 is disabled and second alarm 50 is activated. If the vehicle reverse gear is disengaged, both first alarm 40 and second alarm 50 are disabled. As described herein, second alarm 50 may work in lieu of, or in addition to, first alarm 40.

Figure 4:
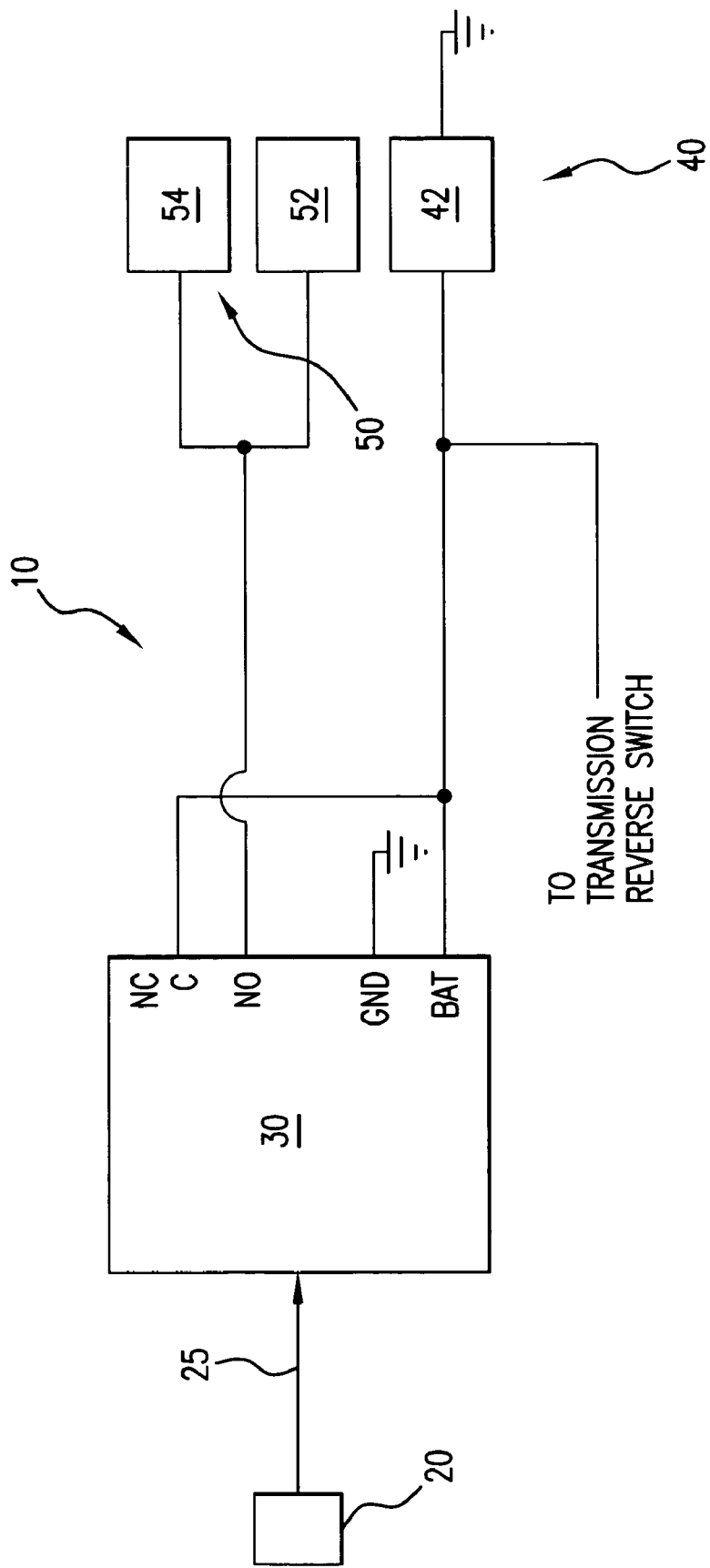
FIG. 4 is a schematic diagram of a back up alarm system for a vehicle, according to one preferred embodiment of this invention.
Figure 5:
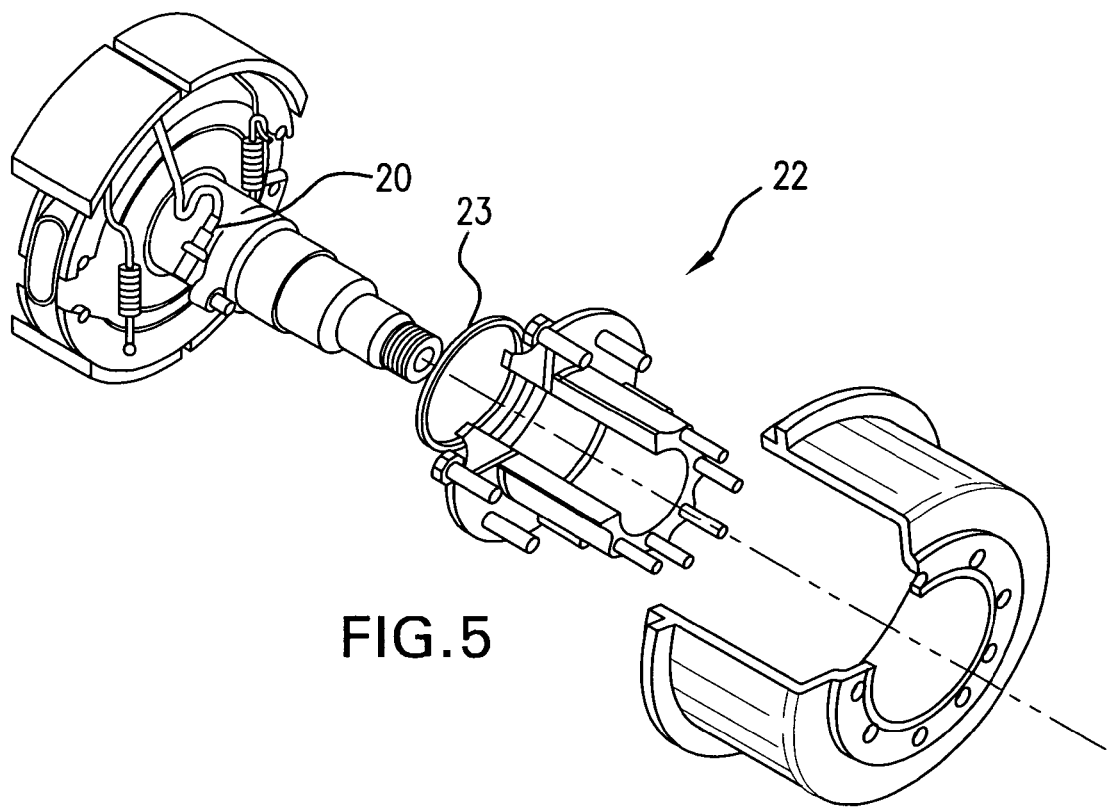
FIG. 5 is a sensor for a back up alarm system for a vehicle, according to one preferred embodiment of this invention.
Figure 6:
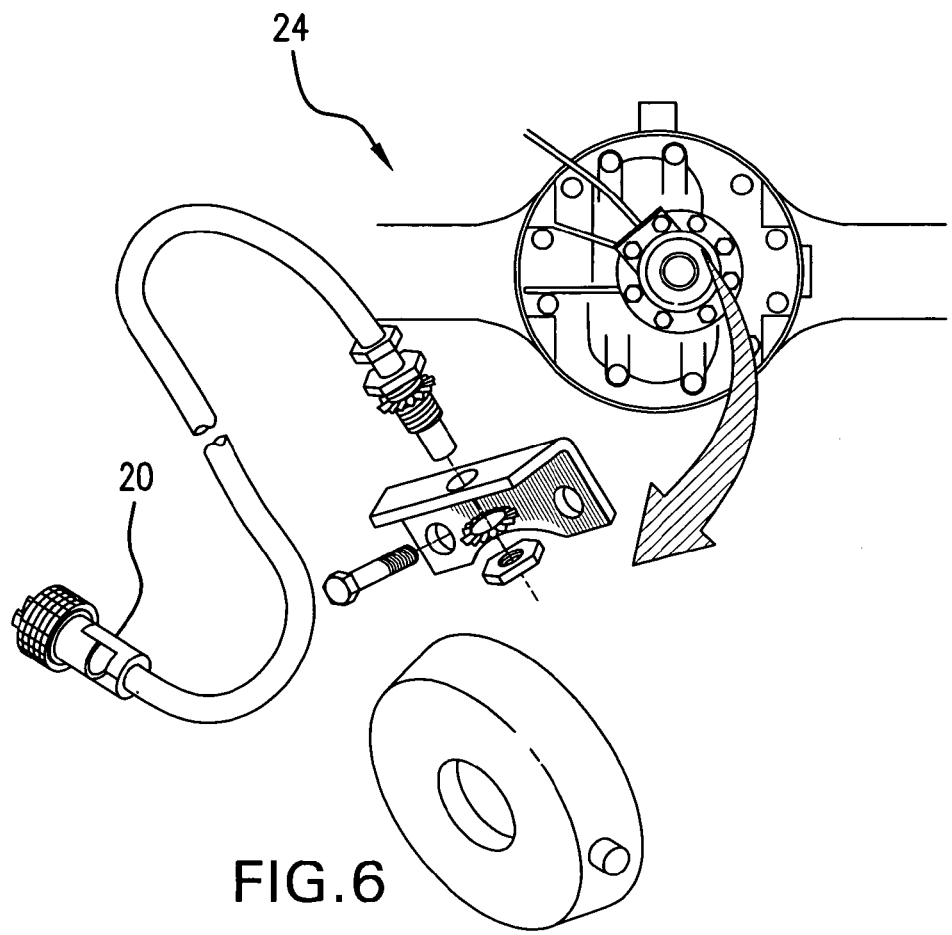
FIG. 6 is a sensor for a back up alarm system for a vehicle, according to one preferred embodiment of this invention.

Referring further to FIGS. 4–6, back up alarm system 10 includes a sensor 20 preferably capable of sensing or detecting vehicle movement, for example by monitoring vehicle wheel rotation or drive shaft rotation. In one preferred embodiment of this invention, an anti-lock braking system (ABS) 22 includes a sensor 20, as shown in FIG. 5. Alternatively, a drive-shaft road speed sensor system 24 includes a sensor 20, as shown in FIG. 6. It is apparent to those skilled in the art and guided by the teachings herein provided that any suitable sensor can be used for sensing or detecting vehicle movement, such as an onboard device, an anti-lock braking system speed sensor, a drive shaft road speed sensor, a dedicated inductive AC signal generator and/or a speedometer.

In one preferred embodiment of this invention, sensor 20 senses or detects a wheel motion and generates a vehicle motion status signal 25 with the reverse gear engaged. For example, in one preferred embodiment of this invention, vehicle motion status signal 25 includes a first or base electrical signal indicating that vehicle 100 is stationary or in a static state. Alternatively, vehicle motion status signal 25 includes a second or threshold electrical signal indicating that vehicle 100 is moving in the reverse direction or in a dynamic state. In one preferred embodiment of this invention, the first or base electrical signal has a magnitude of about 0.267±0.010 volts (V) and the second or threshold electrical signal has a magnitude less than about 0.257 V or greater than about 0.277 V.

A controller 30 is operatively connected to sensor 20 for receiving vehicle motion status signal 25 from sensor 20. A suitable controller 30 is an Acromag IntelliPack® alarm, having a model number 801A-0200, available from Acromag, Inc., Wixom, Mich., U.S.A. It is apparent to those skilled in the art and guided by the teachings herein provided that other suitable controllers can be used in the back up alarm system of the present invention.

Controller 30 processes vehicle motion status signal 25 and activates a first alarm 40 in response to the base electrical signal, i.e., a vehicle motion status signal having a magnitude of about 0.267±0.010 V. Alternatively, controller 30, upon processing vehicle motion status signal 25, activates a second alarm 50 in response to the threshold electrical signal, i.e., a vehicle motion status signal having a magnitude less than about 0.257 V or greater than about 0.277 V. In one preferred embodiment of this invention, first alarm 40 includes an audible warning signal and/or a visual warning signal. Similarly, second alarm 50 includes an audible warning signal and/or a visual warning signal. For example, second alarm 50 preferably includes a voice enunciator 52, as shown in FIG. 3, that can be activated by controller 30 to provide an audible voice or spoken warning signal. Additionally, second alarm 50 may include a visual warning signal, such as a secondary reverse light or at least one strobe light 54. Thus, back up alarm system 10 alerts bystanders not only that a vehicle is in reverse gear, by activating first alarm 40, but that the vehicle is moving in the reverse direction, by activating second alarm 50. Further, each time a motion status change occurs, from the static state to the dynamic state, controller 30 activates voice enunciator 52 and strobe light 54 to indicate vehicle movement separate from the vehicle reverse gear being engaged. Voice enunciator 52 allows bystanders to hear a distinctly different alarm over multiple standard BUAs in the area. Additionally, the high intensity strobe light 54 will reflect off of surrounding objects as well as be seen directly by bystanders to alert bystanders of the onset and/or continued movement of the vehicle in a generally reverse direction. Back up alarm system 10 provides both a direct and an indirect warning signal to bystanders who may not be in direct sight of vehicle 100 moving in the reverse direction. In one preferred embodiment of this invention, the distinct audible warning signal from voice enunciator 52 and the strobe light warning signal of second alarm 50 provides the direct and indirect warnings.

When controller 30 activates second alarm 50, controller 30 preferably also disables first alarm 40, when vehicle 100 is moving in the reverse direction.

Further, controller 30 disables second alarm 50 when first alarm 40 is activated, with the vehicle reverse gear engaged and vehicle 100 stationary or in the static state. In one preferred embodiment of this invention, back up alarm system 10 also includes an in-cab motion alarm (not shown) that is activatable, in addition to the activation of second alarm 50, when vehicle 100 is moving in the reverse direction. Preferably, the in-cab motion alarm is operatively connected to controller 30 to receive a command signal from controller 30 and provide an appropriate warning signal in response to controller 30 receiving a threshold electrical signal from sensor 20. The in-cab alarm alerts the driver to vehicle "drift," which is caused by operator distraction, insufficient braking or purposely releasing the vehicle brakes in a guarded way for close quarters maneuvering without knowing exactly when the vehicle begins to move, for example.

In one preferred embodiment of this invention, backup alarm system 10 includes sensor 20 having a speed sensor mounted within a wheel hub as a component of anti-lock braking system 22, as shown in FIG. 5. With the vehicle reverse gear engaged, sensor 20 normally generates a base electrical signal when a corresponding vehicle wheel is stationary. When the corresponding wheel begins to move or rotate in a reverse direction, sensor 20 generates a threshold electrical signal. Controller 30, operatively connected to sensor 20, receives the base electrical signal and the threshold electrical signal from sensor 20. In response to controller 30 receiving the base electrical signal, controller 30 activates status alarm 40 in responsive communication with controller 30 to generate a first warning signal. Preferably, the first warning signal includes an audible warning signal, such as a repetitive "beeping" noise, and/or a visual warning signal, in addition to the standard reverse taillight signals. Alternatively, or in addition, in response to controller 30 receiving the threshold electrical signal, controller 30 activates motion alarm 50 in responsive communication with controller 30 to generate a second warning signal, preferably different than the first warning signal. For example, the second warning signal preferably includes an audible warning signal different from the first alarm audible warning signal, including a voice or spoken warning message from voice enunciator 52, and a visual warning signal such as a secondary reverse light or strobe light 54.

In one preferred embodiment of this invention, back up alarm system 10 includes a status alarm 40 operatively connected to a transmission of vehicle 100 and activatable upon engagement of the vehicle reverse gear and a motion alarm 50 operatively connected to a vehicle motion sensor 20 and activatable with vehicle 100 moving in the reverse direction. Controller 30 with the vehicle reverse gear engaged activates status alarm 40 and/or motion alarm 50 based on a vehicle motion status. In this preferred embodiment, the vehicle motion status is a static state or a dynamic state. In the static state, controller 30 activates status alarm 40 and disables motion alarm 50. In the dynamic state, controller 30 activates motion alarm 50 and may disable status alarm 40, or status alarm 40 may continue as motion alarm 50 is activated.

Referring to FIG. 5, in one preferred embodiment of this invention, anti-lock braking system (ABS) 22 constantly monitors wheel rotation for skid control as long as the vehicle's ignition is powered. Controller 30 is in communication with any wheel speed sensor of ABS 22, such as by splicing into the wiring harness of sensor 20. Controller 30 receives the electrical signal from the wheel speed sensor. The ABS wheel speed sensors sense or detect an inductive AC signal transmitted from a tone ring 23 to sensor 20. Upon rotation of tone ring 23, an AC signal in the millivolt range is produced. The AC signal includes a base electrical signal of about −0.267 V when the wheel is not rotating. This base electrical signal is normally generated by ABS 22 for self-diagnostic purposes. When the AC signal reaches a threshold level, preferably less than about −0.257 V or greater than about −0.277 V, a threshold electrical signal is transmitted to controller 30. Therefore, there is a direct relationship between voltage production and wheel rotation to allow for conclusive determination of the onset of vehicle motion through wheel rotation and AC signal transmission. Controller 30 can therefore act as a system switch upon detection of the electrical signal.

In one preferred embodiment of this invention, backup alarm system 10 includes sensor 20 operatively connected to the vehicle driveshaft for sensing rotational movement of the driveshaft. For example, the vehicle driveshaft rotates in a clockwise rotational direction when vehicle 100 is moving in a general forward direction. Conversely, the vehicle driveshaft rotates in a counterclockwise rotational direction when vehicle 100 is moving in a general reverse direction. Sensor 20 is preferably, but not necessarily, positioned at a differential input of the driveshaft to sense or detect clockwise rotational movement, indicating that vehicle 100 is moving in the general forward direction, or counterclockwise rotational movement, indicating that vehicle 100 is moving in the general reverse direction.

Sensor 20 senses or detects the direction of rotation to generate a rotational movement signal, indicating a direction of the rotational movement. Controller 30 is operatively connected to sensor 20 and receives the rotational movement signal from sensor 20. Controller 30 activates a motion alarm in response to controller 30 receiving the rotational movement signal to generate a warning signal, such as second alarm 50, when the driveshaft is rotating in a counterclockwise direction, i.e., vehicle 100 is moving in a general reverse direction. In this preferred embodiment of the invention, back up alarm system 10 is activated independently of whether the vehicle reverse gear is engaged. Additionally, the in-cab motion alarm is preferably activated when vehicle 100 is moving in the reverse direction. Thus, back up alarm system 10 can alert bystanders, as well as the vehicle driver, that vehicle 100 is moving in the reverse direction, either intentionally or accidentally, for example when vehicle 100 is in neutral.

Thus, this invention provides a back up alarm system 10 that includes sensor 20 operatively connected to vehicle 100 for sensing or detecting any intentional and/or unintentional movement of vehicle 100. Sensor 20 can sense or detect a rotational movement of at least one vehicle wheel, a rotational movement of the vehicle driveshaft and/or a movement of vehicle 100 with respect to a road or ground surface, for example.

Sensor 20 senses or detects the vehicle movement and generates a movement signal, preferably indicating at least one of a movement direction and a movement speed. Controller 30 is operatively connected to sensor 20 and receives the movement signal from sensor 20. Controller 30 activates a motion alarm in response to controller 30 receiving the movement signal to generate a warning signal, such as second alarm 50, when vehicle 100 is moving in a general reverse direction. Back up alarm system 10 can be activated independently or dependently of an engagement of a vehicle gear. Additionally, an in-cab motion alarm can be activated when sensor 20 senses or detects vehicle movement, such as when vehicle 100 is moving in the reverse direction. Thus, back up alarm system 10 can alert bystanders, as well as the vehicle driver, that vehicle 100 is moving in the reverse direction, either intentionally or unintentionally.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A back up alarm system for a vehicle comprising:
a sensor for generating a vehicle motion status signal with a vehicle reverse gear engaged, the vehicle motion status signal comprising a base electrical signal when the vehicle is stationary and in reverse gear, and a threshold electrical signal when the vehicle is moving in a reverse direction; and
a controller operatively connected to the sensor and receiving the vehicle motion status signal from the sensor, the controller activating a first audible alarm in response to the base electrical signal and activating a second audible alarm in response to the threshold electrical signal, wherein the second audible alarm is audibly distinct from the first audible alarm.

2. The back up alarm system of claim 1 wherein the first audible alarm further comprises a visual warning signal.

3. The back up alarm system of claim 1 wherein the second audible alarm further comprises a visual warning signal.

4. The back up alarm system of claim 1 wherein the second audible alarm comprises a voice enunciator.

5. The back up alarm system of claim 1 wherein the second audible alarm further comprises a secondary reverse light.

6. The back up alarm system of claim 1 wherein the second audible alarm further comprises a strobe light.

7. The back up alarm system of claim 1 wherein the sensor comprises one of an onboard device, an anti-lock braking system speed sensor, a drive shaft road speed sensor, a dedicated inductive AC signal generator and a speedometer.

8. The back up alarm system of claim 1 wherein the controller activates the second audible alarm and disables the first audible alarm when the vehicle is moving in the reverse direction.

9. The back up alarm system of claim 1 wherein the controller disables the second audible alarm when the first audible alarm is activated.

10. The back up alarm system of claim 1 further comprising an in-cab motion alarm activatable when the vehicle is moving in the reverse direction.

11. A back up alarm system comprising:
a sensor, with a vehicle reverse gear engaged, normally generating a base electrical signal when a vehicle wheel is stationary and generating a threshold electrical signal when the vehicle wheel is rotating;
a controller operatively connected to the sensor and receiving the base electrical signal and the threshold electrical signal from the sensor;
a status alarm in responsive communication with the controller and activatable in response to the controller receiving the base electrical signal to generate a first audible warning signal; and
a motion alarm in responsive communication with the controller and activatable in response to the controller receiving the threshold electrical signal to generate a second audible warning signal, distinct from the first audible warning signal.

12. The back up alarm system of claim 11 wherein the sensor comprises one of an onboard device, an anti-lock braking system speed sensor, a drive shaft road speed sensor, a dedicated inductive AC signal generator and a speedometer.

13. The back up alarm system of claim 11 wherein the first audible warning signal further comprises a visual warning signal.

14. The back up alarm system of claim 11 wherein the second audible warning signal further comprises a visual warning signal.

15. The back up alarm system of claim 11 wherein the second audible warning signal comprises a voice enunciator.

16. The back up alarm system of claim 15 wherein the second audible warning signal further comprises a strobe light.

17. The back up alarm system of claim 11 wherein the second audible warning signal further comprises a secondary reverse light.

18. A back up alarm system comprising:
a status alarm operatively connected to a transmission of the vehicle and activatable upon engagement of a vehicle reverse gear;
a motion alarm, audibly distinct from the status alarm, operatively connected to a vehicle motion sensor and activatable when a vehicle is moving in a reverse direction; and
a controller with the vehicle reverse gear engaged activating at least one of the status alarm and the motion alarm based on a vehicle motion status.

19. The back up alarm system of claim 18 wherein the vehicle motion status is one of a static state and a dynamic state.

20. The back up alarm system of claim 18 wherein, in the static state, the controller activates the status alarm and disables the motion alarm.

21. The backup alarm system of claim 18 wherein, in the dynamic state, the controller activates the motion alarm and disables the status alarm.

22. The backup alarm system of claim 18 wherein, in the dynamic state, the controller activates the motion alarm and the status alarm.

* * * * *